(No Model.)
C. H. BRIGGS.
LINE REEL FOR FISHING TACKLE.
No. 325,813.  Patented Sept. 8, 1885.
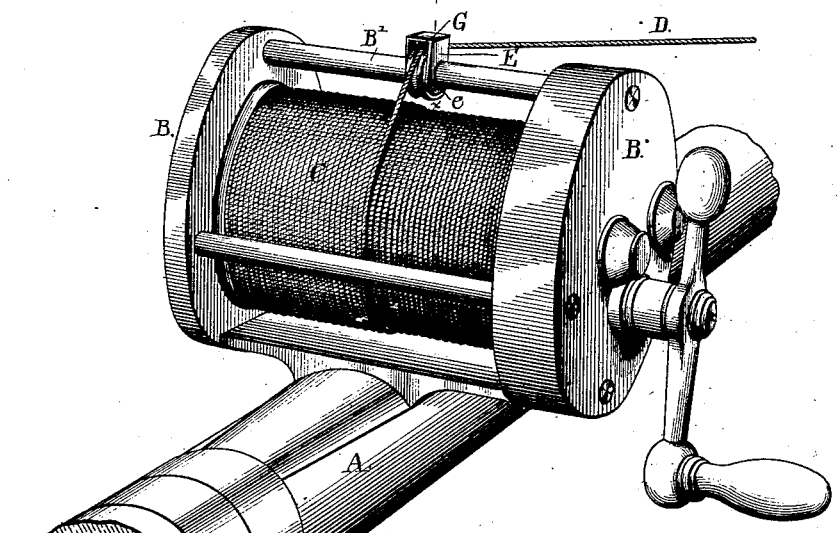
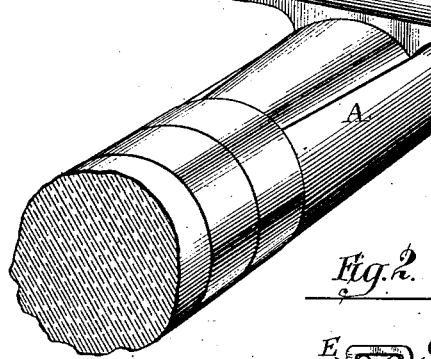
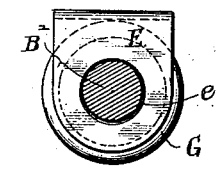
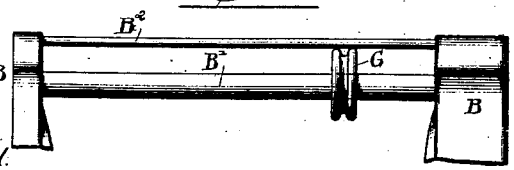
Witnesses:-
Louis M. Whitehead.
C. C. Poole
Inventor:-
Charles H. Briggs.
by:-
M. E. Dayton
Attorney

UNITED STATES PATENT OFFICE.

CHARLES H. BRIGGS, OF KANKAKEE, ILLINOIS.

LINE-REEL FOR FISHING-TACKLE.

SPECIFICATION forming part of Letters Patent No. 325,813, dated September 8, 1885.

Application filed July 10, 1885. (No model.)

*To all whom it may concern:*

Be it known that I, CHARLES H. BRIGGS, of Kankakee, in the county of Kankakee and State of Illinois, have invented certain new and useful Improvements in Line-Reels for Fishing-Tackle; and I do hereby declare that the following is a full, clear, and exact description thereof, reference being had to the accompanying drawings, and to the letters of reference marked thereon, which form a part of this specification.

The object of this invention is to provide an improved construction in line-reels for fishing-tackle whereby the line may be evenly wrapped or laid in regular coils upon the reel as it is wound upon the latter; and the invention consists in the matters hereinafter described, and pointed out in the appended claims.

A device embodying my invention may be applied to the reel attached to a fishing-rod or to a line-reel adapted for use otherwise—as, for instance, by being attached to the gunwale of a boat in trolling. Said device comprises a freely-rotating grooved wheel or pulley mounted to slide freely longitudinally upon one of the stationary cross-bars of the reel-frame, or other suitable rod or bar supported upon the reel-frame parallel with the axis of the reel, the line being trained over the said pulley in passing from the reel. In connection with said pulley, a U-shaped piece of metal or loop embracing the cross-bar at either side of the pulley and extending over the groove of the latter is preferably employed to retain the line within the groove, as will hereinafter more fully appear.

The invention may be more fully understood by reference to the accompanying drawings, in which Figure 1 is a perspective view of a line-reel embodying my invention. Fig. 2 is a detail elevation of the guide-pulley thereof. Fig. 3 is a sectional side view of the same, taken upon line $x$ $x$ of Fig. 1. Fig. 4 is a detail view illustrating a different form of the device for retaining the line within the pulley-groove.

In the exact construction of the device herein illustrated, A indicates a fishing-rod to which the reel is shown as attached; B, the reel frame; C, the reel, and D the line.

G is the pulley, which is mounted to rotate and slide longitudinally upon one of the cross-bars B' of the reel-frame, preferably the upper cross-bar of the latter. The said pulley is grooved in its periphery to receive the line and operates to guide the latter back and forth as the line is wound in, so as to lay the line evenly or in coils side by side upon the reel, the lateral movement of the pulley being caused by the part of the unwound line which is adjacent to the reel coming in contact with the previously-wound coil, and being crowded or pushed laterally thereby.

Mounted to slide and rotate upon the bar B' also, is a metal loop, E, which is adapted to embrace the edge of the pulley D, so as to prevent the line from accidental disengagement therefrom when the line is loosened or under other circumstances. In the particular construction shown the loop E is made of thin sheet metal bent around the pulley, as shown, and provided with apertures $e$ $e$, through which the bar B' is inserted. The said loop E may, however, be pivotally supported upon the bar otherwise than shown without departure from my invention. Said loop is in practice preferably made thin and light, and adapted to swing and slide freely and easily upon the cross-bar, so that it may be held from rotation by the line with little pressure thereon.

It will be understood, of course, that the cross-bar upon which the pulley is mounted may be sustained upon the reel-frame or from a rod otherwise than as shown, and that a guide-pulley may be made possessing some of the advantages of that shown, in which the loop E or a part corresponding thereto is absent—as, for instance, the construction may be used which is shown in Fig. 4, in which B² is a second stationary transverse bar parallel with B' and standing adjacent to the periphery of the pulley, so as to prevent the line coming out of the groove.

I am aware that it has been proposed heretofore to use upon a line-reel a traversing cord-guide operated by means of a revolving cylinder having oppositely-directed spiral grooves engaged with the guide and actuated by the turning of the reel. The device herein shown, in which the pulley guiding the cord is adapted to move freely longitudinally, as well as to turn upon the bar B', has the important advantage of being much more simple and cheap in construction than the prior device above referred to, while at the same time being entirely effective for the purpose for which it is intended.

It is to be understood also that the appended claims cover the devices and the several parts or elements therein set forth, when said devices, parts, or elements are in form to obtain either, any, or all of the advantages, purposes, or functions obtained by them in the particular construction illustrated herein.

I claim as my invention—

1. The combination, with a line-reel, of a cross-bar, B', supported upon the reel-frame parallel with the axis of the reel, a pulley mounted to freely rotate and slide upon said bar, and means constructed to retain the line within the groove of the pulley, substantially as described.

2. The combination, with a line-reel and a frame therefor provided with a cross-bar, B', of a pulley mounted to freely rotate and slide longitudinally upon the said bar, and a metal loop, E, embracing the peripheral portion of the pulley, and also constructed to slide and rotate upon the bar, substantially as described.

In testimony that I claim the foregoing as my invention I affix my signature in presence of two witnesses.

CHARLES H. BRIGGS.

Witnesses:
M. E. DAYTON,
G. F. LANAGHEN.